US010191949B2

(12) United States Patent
Ng et al.

(10) Patent No.: US 10,191,949 B2
(45) Date of Patent: Jan. 29, 2019

(54) RECOMMENDATION SYSTEM USING A TRANSFORMED SIMILARITY MATRIX

(71) Applicant: Comcast Cable Communications, LLC, Philadelphia, PA (US)

(72) Inventors: Sheau Ng, Wayland, MA (US); Oliver Jojic, Annandale, VA (US); Amit Bagga, Basking Ridge, NJ (US); Hassan Sayyadi-Harikandehei, Washington, DC (US); Sujoy Roy, Singapore (SG); Wei Yun Yau, Singapore (SG); Kong Wah Wan, Singapore (SG)

(73) Assignees: NBCUniversal Media, LLC, New York, NY (US); Comcast Cable Communications, LLC, Philadelphia, PA (US); Agency for Science, Technology and Research, Singapore (SG)

( * ) Notice: Subject to any disclaimer, the term of this patent is extended or adjusted under 35 U.S.C. 154(b) by 402 days.

(21) Appl. No.: 14/743,374

(22) Filed: Jun. 18, 2015

(65) Prior Publication Data

US 2016/0371274 A1  Dec. 22, 2016

(51) Int. Cl.
*G06F 17/30* (2006.01)

(52) U.S. Cl.
CPC .... *G06F 17/3053* (2013.01); *G06F 17/30539* (2013.01)

(58) Field of Classification Search
CPC ......... G06F 17/30002; G06F 17/30539; G06F 17/30699; G06F 17/3071; G06F 17/30734; G06F 17/30914

USPC ................................ 707/737, 748, 749, 777
See application file for complete search history.

(56) References Cited

U.S. PATENT DOCUMENTS

| 6,694,311 | B1  | 2/2004  | Smith |
| 7,272,593 | B1* | 9/2007  | Castelli ............ G06F 17/30648 |
|           |     |         | 707/600 |
| 7,526,458 | B2  | 4/2009  | Flinn et al. |
| 8,620,919 | B2  | 12/2013 | Gates et al. |
| 8,694,457 | B2  | 4/2014  | Flinn et al. |
| 8,843,430 | B2  | 9/2014  | Jojic et al. |
| 9,473,730 | B1* | 10/2016 | Roy ..................... H04H 60/44 |
| 2003/0218696 | A1 | 11/2003 | Bagga et al. |

(Continued)

FOREIGN PATENT DOCUMENTS

WO    2011034955 A2    3/2011

OTHER PUBLICATIONS

Extended European Search Report—EP 12189192.3—dated Feb. 12, 2013.

(Continued)

*Primary Examiner* — Monica M Pyo
(74) *Attorney, Agent, or Firm* — Banner & Witcoff, Ltd.

(57) ABSTRACT

Systems and methods for transforming a similarity matrix used to generate content item recommendation lists are described. The system may determine a weight (used to transform the similarity matrix) sufficient to place one or more content items on the content item recommendation list or at a particular position on the recommendation list. The transformed similarity matrix may further be reduced in size, and content recommendations may be generated using the transformed or reduced similarity matrix.

20 Claims, 9 Drawing Sheets

(56) References Cited

U.S. PATENT DOCUMENTS

| | | | |
|---|---|---|---|
| 2005/0165782 A1* | 7/2005 | Yamamoto | G06F 17/30017 |
| 2007/0028266 A1 | 2/2007 | Trajkovic et al. | |
| 2009/0012965 A1 | 1/2009 | Franken | |
| 2009/0100094 A1 | 4/2009 | Verdaguer et al. | |
| 2010/0332440 A1 | 12/2010 | Brodsky | |
| 2012/0290518 A1 | 11/2012 | Flinn et al. | |
| 2012/0297038 A1 | 11/2012 | Mei et al. | |
| 2013/0103634 A1* | 4/2013 | Jojic | G06Q 30/02 706/52 |
| 2014/0108316 A1 | 4/2014 | Goldman | |
| 2014/0164401 A1 | 6/2014 | Kyaw et al. | |
| 2016/0154887 A1 | 6/2016 | Zhao | |

OTHER PUBLICATIONS

Ahn, "A new similarity measure for collaborative filtering to alleviate the new user cold-starting problem," Information Sciences, 2008. 178(1): pp. 37-51.

Anand and Bharadwaj, "Utilizing various sparsity measures for enhancing accuracy of collaborative recommender systems based on local and global similarities," Expert Systems with Applications, 2011. 38(5), pp. 5101-5109.

Apache Foundation. Available from: http://mahout.apache.org/, pp. 1-3.

Bambini et al., "A Recommender System for an IPTV Service Provider: a Real Large-Scale Production Environment," Recommender Systems Handbook, 2011: p. 299-331. (I see pp. 1-16.).

Cantador et al., "Content-based recommendation in social tagging systems," Recommender Systems. 2010, Sep. 26-30, 2010, pp. 1-4.

Fu and Leng, "A Framework for Recommender Systems in E-Commerce Based on Distributed Storage and Data-Mining," 2010 International Conference on E-Business and E-Government, 2010, pp. 3502-3505.

Adomavicius and Tuzhilin, "Toward the Next Generation of Recommender Systems: A Survey of the State-of-the-Art and Possible Extensions," IEEE Transactions on Knowledge and Data Engineering, Jun. 2005. 17(6): p. 734-749.

Gong, "An Efficient Collaborative Recommendation Algorithm Based on Item Clustering," Advances in Wireless Networks and Information Systems, 2010. 72, pp. 381-387.

GroupLens Research. Available from: http://www.grouplens.org/node/12, pp. 1-3.

Gunawardana and Shani, "A Survey of Accuracy Evaluation Metrics of Recommendation Tasks," The Journal of Machine Learning Research, 2009. 10, pp. 2935-2962.

Herlocker et al., "Evaluating collaborative filtering recommender systems," ACM Transactions on Information Systems (TOIS), Jan. 2004. 22(1), pp. 5-53.

Jiang and Wang, "Pagerank-Based Collaborative Filtering Recommendation," Information Computing and Applications, 2010. 6377, pp. 597-604.

Karypis, "Evaluation of Item-Based Top-N Recommendation Algorithms," Proceedings of the tenth international conference on Information and knowledge management. 2001, pp. 1-8.

Koren, "Factorization meets the neighborhood: a multifaceted collaborative filtering model," Proceeding of the 14th ACM SIGKDD international conference on Knowledge discovery and data mining. 2008, pp. 1-9.

Lekakos and Caravelas, "A hybrid approach for movie recommendation," Multimedia Tools and Applications, 2008. 36(1-2): p. 55-70.

Liang et al. "Collaborative Filtering Recommender Systems Using Tag Information," International Conference on Web Intelligence and Intelligent Agent Technology. 2008, pp. 59-62.

Melville and Sindhwani, "Recommender Systems," Encyclopedia of Machine Learning, 2010, Chapter No. 00338, pp. 1-9.

Miller et al., "MovieLens unplugged: experiences with an occasionally connected recommender system," Proceedings of the 8th international conference on Intelligent user interfaces. Jan. 12-15, 2003, pp. 263-266.

Musto, "Enhanced vector space models for content-based recommender systems," Recommender Systems. Sep. 26-30, 2010, pp. 361-364.

Ormándi et al., "Overlay Management for Fully Distributed User-Based Collaborative Filtering," Lecture Notes in Computer Science, 2010. 6271-6282.

Resnick and Varian, "Recommender systems," Communications of the ACM, 1997. 40(3), pp. 56-58.

Sarwar et al. "Item-based collaborative filtering recommendation algorithms," Proceedings of WWW '01 Proceedings of the 10th international conference on World Wide Web. May 1-5, 2001, pp. 285-295.

Schlieder, "Modeling Collaborative Semantics with a Geographic Recommender," Advances in Conceptual Modeling—Foundations and Applications, Nov. 6-9, 2007. 4802-4812.

Su and Khoshgoftaar, "A survey of collaborative filtering techniques," Advances in Artificial Intelligence, 2009.

Töscher et al., "Improved neighborhood-based algorithms for large-scale recommender systems," Proceedings of the 2nd KDD Workshop on Large-Scale Recommender Systems and the Netflix Prize Competition. Aug. 24, 2008, pp. 1-6.

Wang et al., "Probabilistic relevance ranking for collaborative filtering," Information Retrieval, 2008. 11(6), pp. 1-27.

Zhao and Shang, "User-based collaborative-filtering recommendation algorithms on hadoop," Third International Conference on Knowledge Discovery and Data Mining. 2010, pp. 478-481.

Jojic et. al., "A Probabilistic Definition of Item Similarity," RecSys '11 Proceedings of the Fifth ACM Conference on Recommender Systems, Oct. 23-27, 2011, pp. 229-236, ACM New York, NY, USA.

Deshpande, M. et al. Item-based top-N recommendation algorithms, ACM Transactions on Information Systems, vol. 22, No. 1 (Jan. 2004), pp. 143-177.

Papagelis et al. "Qualitative analysis of user-based and item-based prediction algorithms for recommendation agents". Engineering Applications of Artificial Intelligence vol. 18 No. 7 (2005) pp. 781-789.

Ryan Tibshirani, "Modern regression 1: Ridge regression", Mar. 19, 2013.

Io (post author), "Differences between the L1-norm and the L2-norm (Least Absolute Deviations and Least Squares)", Garbled Notes: Things I Left Hanging Around, Dec. 3, 2013. Retrieved on Mar. 12, 2015 from <http://www.chioka.in/differences-between-the-l1-norm-and-the-l2-norm-least-absolute-deviations-and-least-squares/>.

"Getting Started—DeepLearning 0.1 documentation", Deeplearning.net, retrieved on Jan. 23, 2015 from <http://deeplearning.net/tutorial/gettingstarted.html#opt-sgd>.

Yifan Hu et al., "Collaborative Filtering for Implicit Feedback Datasets", Data Mining, 2008.

Vered Kunik, "Item Based Collaborative filtering Recommendation Algorithms", accessed Feb. 13, 2015.

Carl D. Meyer, "Matrix Analysis and Applied Linear Algebra", SIAM, Apr. 19, 2000, pp. 269-458.

Ashutosh Saxena et al., "Non-linear Dimensionally Reduction by Locally Linear Isomaps", Indian Institute of Technology Kanpur, 2004.

Francesco Ricci, "Part 13: Item-to-Item Collaborative Filtering and Matrix Factorization", retrieved Feb. 13, 2015.

Kirk Baker, "Singular Value Decomposition Tutorial", Mar. 29, 2005.

"Symmetric Matrix", Wikipedia, retrieved on Feb. 13, 2015 from <http://en.wikipedia.org/wiki/Symmetric_matrix>.

European Office Action—EP Appl. 12189192.3—dated Mar. 3, 2016.

Jan. 16, 2018—European Office Action—EP 12189192.3.

Feb. 28, 2018—Extended European Search Report—17202818.5.

Aug. 9, 2018—Canadian Office Action—CA 2,792,558.

* cited by examiner

800

Algorithm 2 Maximizing Recall
Input: Validation Training Set $Y_T \leftarrow U \times I$, Validation Test Set $Y_t \leftarrow U \times I$, $U$ is set of users, $I$ is set of $N$ items, similarity matrix $simMat$ of size $N \times N$, non-personalized item score vector $p$, regularization parameter $\lambda$, learning rate $\gamma$, recall difference threshold $T$ and number of top items recommended $K$
Output: Weight matrix $W = \{w_{jk}\}$ 805 — Initialize weight matrix $W$, with $w_{jk} = 1$ s.t. $simMat(j,k) > 0, \forall 1 \leq j \leq N, 1 \leq k \leq N$
810 — Scale $simMat$ appropriately to bound value range limits. viz. $log(simMat)$
815 — $tsimMat = W * simMat$
repeat
    for $u \in U$ do
820 —         Generate recommendations list and sort in descending order: $l(u,i) = sort(GENREC(tsimMat, Y_T, u)), \forall i \in I$
825 —     end for
    Compute recall at top-K: $brecall@K$
    for $u \in U$ do
830 —         Generate list of items not in $top - K$: $\{j : j \notin [1,K]\}$
835 —         for $(u,k) \in Y_T : simMat(j,k) > 1$ do
            Compute weight update $\delta w_{jk}$
840 —         end for
        Update Weight matrix $W$: $w_{jk} = w_{jk} + \gamma \delta w_{jk}$
    end for
845 — $tsimMat = W * simMat$
850 — for $u \in U$ do
        Generate recommendations list and sort in descending order: $l(u,i) = sort(GENREC(tsimMat, Y_T, u)), \forall i \in I$
855 — end for
860 — Compute recall at top-K: $arecall@K$
865 — until $brecall@K - arecall@K > T$
Return $W$

FIG. 8

RECOMMENDATION SYSTEM USING A TRANSFORMED SIMILARITY MATRIX

BACKGROUND

Content items, such as movies, television shows, music, etc., may be recommended to users. A similarity matrix that indicates the similarity between content items in the matrix can be used to make recommendations. For example, each content item may have a corresponding row and column in the matrix, and the similarity between any two content items is indicated by the value in the similarity matrix corresponding to the intersection of the two content items' respective rows and columns. If numerous content items are included in the similarity matrix, the similarity matrix can be very large. For example, if 100,000 content items are in the matrix, the similarity matrix may have dimensions of 100,000 by 100,000. A large similarity matrix may present several problems. The similarity matrix may require a significant amount of memory for storage and processing. It may also take a long time to load the similarity matrix into memory, such as when the matrix is used online to generate content recommendations for users. Conventional matrix-reduction algorithms may be used to reduce the size of a large similarity matrix. However, the accuracy of content recommendations using the resulting similarity matrix may suffer. These and other problems are addressed by the present disclosure.

SUMMARY

A similarity matrix may be reduced in size using, for example, a matrix decomposition algorithm. However, recall performance may decrease because information may be lost during the reduction process. Accordingly, a tradeoff between reducing space and time complexity and preserving recall performance may be achieved using a proper transformation and/or decomposition of the similarity matrix. In the present disclosure, a learning-based reduction of the similarity matrix is proposed to transform the similarity matrix in a way that allows for conventional lossy matrix reduction approaches, such as SVD, without significantly degrading the recall performance (or degrading the recall performance at all).

Some of the various features described herein relate to a system and method for generating, by a computing device, a list of content items to recommend to a user based on a similarity matrix. Responsive to a determination that a first content item was not in the list of content items to recommend to the user, a weight may be applied to the similarity matrix to generate a weighted similarity matrix. The weight may comprise a weight matrix. Applying the weight to the similarity matrix may comprise linearly transforming the similarity matrix using the weight. Alternatively, applying the weight to the similarity matrix may comprise nonlinearly transforming the similarity matrix using the weight.

A second list of content items to recommend to the user may be generated based on the weighted similarity matrix. A determination of whether the first content item was in the second list of content items to recommend to the user may be made. A list of content items to recommend to a second user may be generated based on the weighted similarity matrix The method may further comprise responsive to determining that the first content item was in the second list of content items to recommend to the user (e.g., a first user), generating a third list of content items to recommend to a second user based on the weighted similarity matrix. Moreover, responsive to a determination that a second content item was not in the third list of content items to recommend to the second user, the weight may be updated and the updated weight may be applied to the similarity matrix to generate a second weighted similarity matrix. A fourth list of content items to recommend to the first user may be generated based on the second weighted similarity matrix.

In some aspects, the determination that the first content item was not in the list of content items to recommend to the user may comprise a determination that the first content item and a second content item were not in the list of content items to recommend to the user. Determining whether the first content item was in the second list of content items to recommend to the user may comprise determining whether the first content item and the second content item were in the second list of content items to recommend to the user. The method may also include determining that the user previously consumed the first content item, and the determination that the first content item was not in the list of content items to recommend to the user may be performed responsive to the determining that the user previously consumed the first content item. Alternatively, the method may include determining that the user liked the first content item, and the determination that the first content item was not in the list of content items to recommend to the user may be performed responsive to the determining that the user liked the first content item.

The method may comprise generating a decomposed similarity matrix by performing, for example, a singular value decomposition (SVD) on the weighted similarity matrix. The decomposed similarity matrix may be smaller than the weighted similarity matrix. Furthermore, generating the second list of content items to recommend to the user based on the weighted similarity matrix may comprise generating the second list of content items to recommend to the user based on the decomposed similarity matrix.

Some of the various features described herein relate to a system and method for responsive to a determination that a first content item was not in a first list of content items to recommend to a user, determining, by a computing device, a weight to apply to a similarity matrix to place the first content item at a first position in the first list of content items to recommend to the user. A second list of content items to recommend to the user may be generated based on the weight and the similarity matrix.

Determining the weight to apply to the similarity matrix to place the first content item at the first position in the first list of content items to recommend to the user may comprises determining a recommendation score for a second content item at the first position in the first list of content items to recommend to the user, and determining the weight to apply to the similarity matrix so that a recommendation score for the first content item is greater than or equal to the recommendation score for the second content item.

Generating the second list of content items to recommend to the user based on the weight and the similarity matrix may comprise multiplying the weight and the similarity matrix to generate a weighted similarity matrix, and generating the second list of content items to recommend to the user based on the weighted similarity matrix. The system and method may further comprise responsive to a determination that the first content item was in the second list of content items to recommend to the user, generating a third list of content items to recommend to a second user based on the weight and the similarity matrix.

In some aspects, the determination that the first content item was not in the first list of content items to recommend to the user may comprise a determination that the first content item and a second content item were not in the first list of content items to recommend to the user. Determining the weight to apply to the similarity matrix to place the first content item at the first position in the first list of content items to recommend to the user may comprise determining the weight to apply to the similarity matrix to place the first content item at the first position and to place the second content item at a second position in the first list of content items to recommend to the user.

The method may also comprise generating a weighted similarity matrix by applying the weight to the similarity matrix. A reduced similarity matrix may be generated by applying a matrix reduction algorithm to the weighted similarity matrix. The reduced similarity matrix may be smaller than the weighted similarity matrix. Generating the second list of content items to recommend to the user based on the weight and the similarity matrix may comprise generating the second list of content items to recommend to the user based on the reduced similarity matrix.

Some of the various features described herein relate to a system and method for determining, by a computing device, a first weight to apply to a similarity matrix in order to include a first content item on a first list of content items to recommend to a first user. The system and method may further comprise determining a second weight to apply to the similarity matrix in order to include a second content item on a second list of content items to recommend to a second user. A combined weight based on the first weight and the second weight may be determined. The combined weight may be applied to the similarity matrix to generate a weighted similarity matrix. A third list of content items to recommend to the first user may be generated based on the weighted similarity matrix.

The system and method may comprise generating a fourth list of content items to recommend to the second user based on the weighted similarity matrix. Moreover, a fifth list of content items to recommend to a third user may be generated based on the weighted similarity matrix.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 8 illustrates another example algorithm for determining a weight used to transform a similarity matrix according to one or more illustrative aspects of the disclosure.

DETAILED DESCRIPTION

Figure 1:
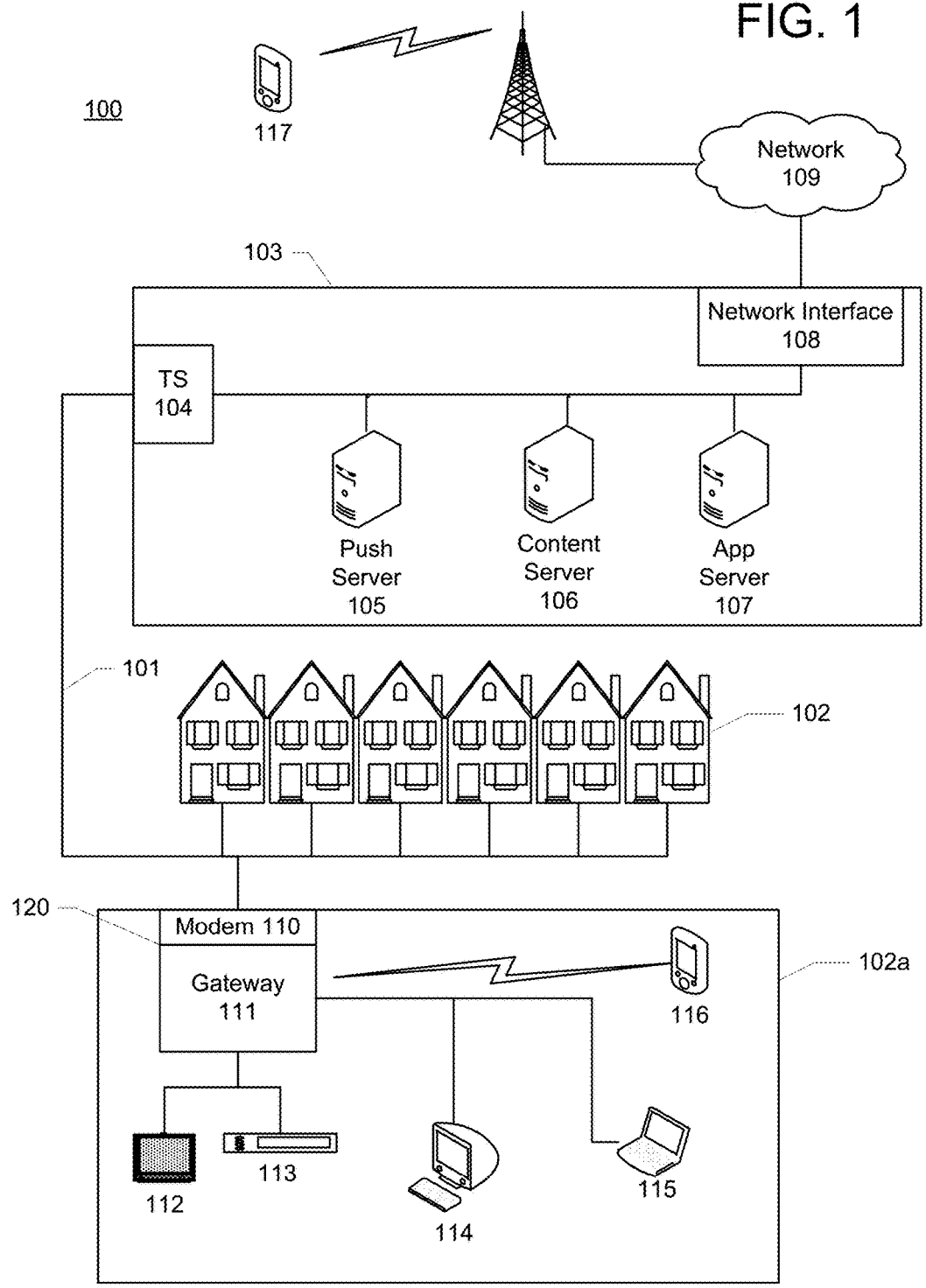
FIG. 1 illustrates an example data access and distribution network.

FIG. 1 illustrates an example data access and distribution network 100 on which many of the various features described herein may be implemented. Network 100 may be any type of data distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as homes 102, to a local office (e.g., a central office or headend 103). The local office 103 may transmit downstream data signals onto the links 101, and each home 102 may have a receiver used to receive and process those signals.

There may be one link 101 originating from the local office 103, and it may be split a number of times to distribute the signal to various homes 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as servers 105-107 (to be discussed further below). The interface may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface may be configured to place data on one or more downstream channels or frequencies to be received by devices, such as modems at the various homes 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various homes 102 in the network (or more specifically, to the devices in the homes 102 that are configured to detect such notifications). The local office 103 may also include a data server 106. The data server 106 may be one or more computing devices that are configured to provide data to users in the homes. This data may be, for example, video on demand movies, television programs, songs, text listings, etc. The data server 106 may include software to validate user identities and entitlements, locate and retrieve requested data, encrypt the data, and initiate delivery (e.g., streaming) of the data to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements and/or providing content recommendations to users, as will be explained in further detail below. Another application server may be responsible for formatting and inserting advertisements in a video stream being transmitted to the homes 102.

An example home 102a may include an interface 120. The interface may comprise a device 110, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired modem device. The device 110 may be connected to, or be a part of, a gateway interface device 111. The gateway interface device 111 may be a computing device that communicates with the device 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, Bluetooth, zigbee, cellular, and others).

Figure 2:
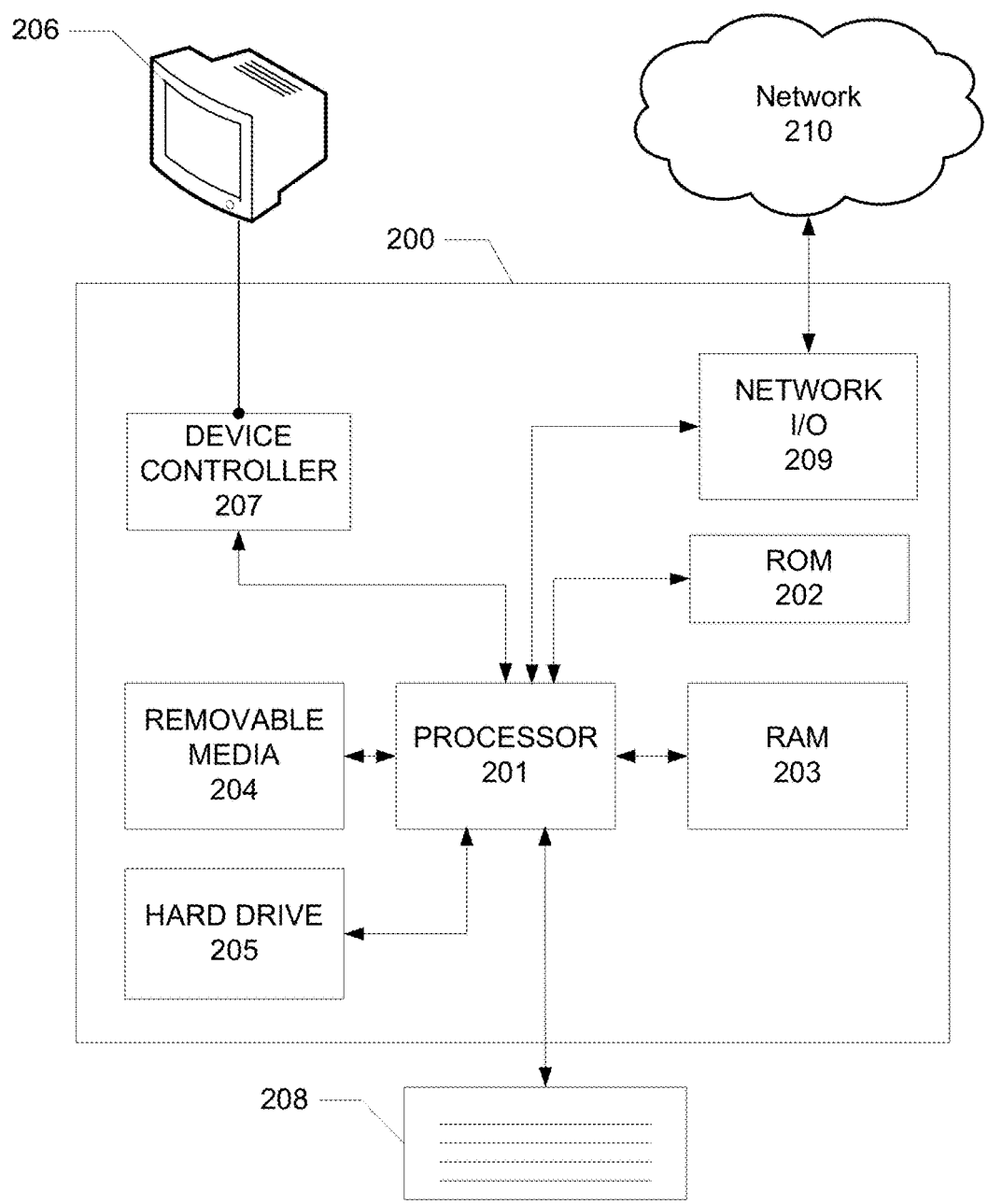
FIG. 2 illustrates an example hardware and software platform on which the various elements described herein can be implemented.

FIG. 2 illustrates general hardware and software elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

Figure 3:
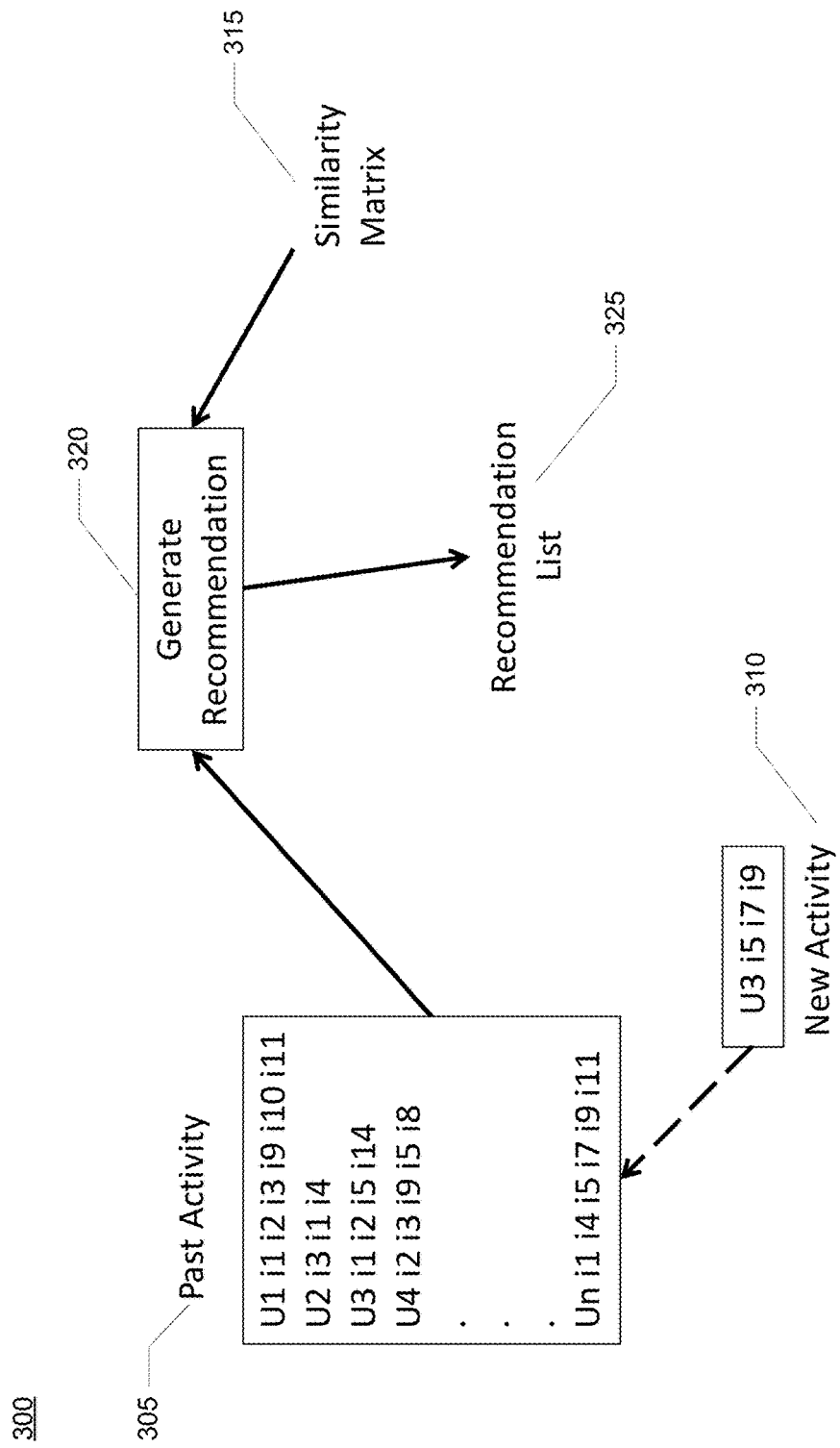
FIG. 3 illustrates an example system for generating item recommendations based on a similarity matrix according to one or more illustrative aspects of the disclosure.

FIG. 3 illustrates an example system 300 for generating item recommendations based on a similarity matrix 315 according to one or more illustrative aspects of the disclosure. A database may store users' past activity 305. For example, User 1 (U1) may have previously consumed or liked content items i1, i2, i3, i9, i10, and i11. User 2 (U2) may have previously consumed or liked content items i3, i1, and i4. User 3 (U3) may have previously consumed or liked content items i1, i2, i5, and i14. The database may also store and/or receive information indicating users' new activity 310. For example, User 3 may have recently consumed or liked content items i5, i7, and i9. The database may be updated with users' new activity as new activity information is received.

The system 300 may also receive and/or store a similarity matrix 315. The similarity matrix 315 may indicate the level of similarity between content items. For example, each entry in the similarity matrix 315 may include a value that indicates the similarity between the content items that intersect at that entry. The similarity value between two content items may be based on any number of factors. For example, content items that share a genre may be considered more similar than if they do not share a genre. Content items that have the same actor may be considered more similar than if they do not have any actors in common. The similarity between content items may also be based on user preferences. For example, two content items may be considered more similar if several users in the same demographic or residing in the same geographic location (e.g., city, state, country, etc.) have each indicated an interest in both content items. Alternatively, two content items may be considered more similar if a large number of users have indicated an interest in both content items, without regard to demographic or geography. The foregoing examples of similarity are merely exemplary, and the similarity values may be determined based on any number of factors. Moreover, each considered factor may be weighted such that some factors are considered more important than other factors.

If a total of N content items are included in the matrix, the size of the similarity matrix 315 may be N×N (i.e., N rows and N columns). The similarity matrix may be symmetric, such that the matrix is equal to its transpose. If the similarity matrix is symmetric, duplicative entries may be discarded (e.g., set to 0). For example, a 3×3 symmetric similarity matrix may be as follows:

$$\begin{array}{c} & i1 & i2 & i3 \\ i1 & \begin{bmatrix} 1 & .5 & .7 \\ .5 & 1 & .23 \\ .7 & .23 & 1 \end{bmatrix} \\ i3 & \end{array}$$

By discarding duplicative entries (i.e., each of the duplicative similarity values between i1 and i2, i1 and i3, and i2 and i3), the amount of data stored in the symmetric similarity matrix may be reduced, and the matrix may be as follows:

$$\begin{array}{c} & i1 & i2 & i3 \\ i1 & \begin{bmatrix} 1 & 0 & 0 \\ .5 & 1 & 0 \\ 0.7 & .23 & 1 \end{bmatrix} \\ i3 & \end{array}$$

Moreover, entries for the intersection of a content item with itself may also be discarded to reduce the amount of data stored in the matrix:

$$\begin{array}{c} & i1 & i2 & i3 \\ i1 & \begin{bmatrix} 0 & 0 & 0 \\ .5 & 0 & 0 \\ 0.7 & .23 & 0 \end{bmatrix} \\ i3 & \end{array}$$

As illustrated, similarity values may range from 0 (no similarity) to 1 (100% similar). A range of 0 to 1 is illustrative, and any number range may be used. Many other ways of representing similarity between two items exist. For example, similarity values may range from negative infinity to positive infinity.

On the other hand, entries might not be discarded if the similarity matrix is not symmetric. For example, a non-symmetric similarity matrix may be as follows:

$$\begin{array}{c} & i1 & i3 & i2 \\ i1 & \begin{bmatrix} 1 & .7 & .5 \\ .5 & .23 & .1 \\ .7 & 1 & .23 \end{bmatrix} \\ i3 & \end{array}$$

Items may be grouped in a non-symmetrical way if the rows of content items and column of content items are ordered differently. For example, the rows may be ordered by the identity of the content item (e.g., title alphabetically, numerically by content identifier, etc.), and the columns may be ordered by decreasing similarity value (e.g., 1, 0.7, and then 0.5) or relationship between content items (e.g., if content item i1 and content item i2 are different episodes in the same TV series, have an actor or writer in common, have the same genre, etc.).

Returning to FIG. 3, a recommender 320 may generate a content recommendation list 325 using the similarity matrix 315 and the user's activity information 305 (and/or 310). In some aspects, the same similarity matrix may be used to generate content recommendations for all users. Each user may comprise an individual person or a group of people. For example, each person in a household 102 may be considered a different user. Alternatively, all users in the same household (e.g., a family) or that use the same device (e.g., a gateway interface device 111, an STB 113, etc.) may be considered one user for the purpose of generating content recommendations.

Recommendations may be generated online or offline. For offline recommendations, the amount of time used to generate a list of recommendations may be more than the time difference between two consecutive requests for recommendations. On the other hand, for online recommendations, the amount of time used to generate a list of recommendations may be less than the time difference between two consecutive requests. The content recommendations described herein may be made either online or offline based on the window of usage activity considered. An online recommendation may be made if a shorter window of usage activity (e.g., a window that is at least a certain margin of time shorter than the amount of time between requests) is used. An offline recommendation may be made if a longer window of usage activity is used.

The content recommendations described herein may additionally or alternatively be made either online or offline based on whether the recommendation is personalized or non-personalized. Non-personalized recommendations (which may be primarily statistics-based, such as a popularity-based recommendation) may be faster to generate than personalized recommendations. Accordingly, if an online recommendation is preferred, the system may generate a non-personalized recommendation. Otherwise, the system may generate a personalized recommendation for an offline recommendation. Personalized and non-personalized recommendations will be described in further detail in the examples that follow.

Figure 4:
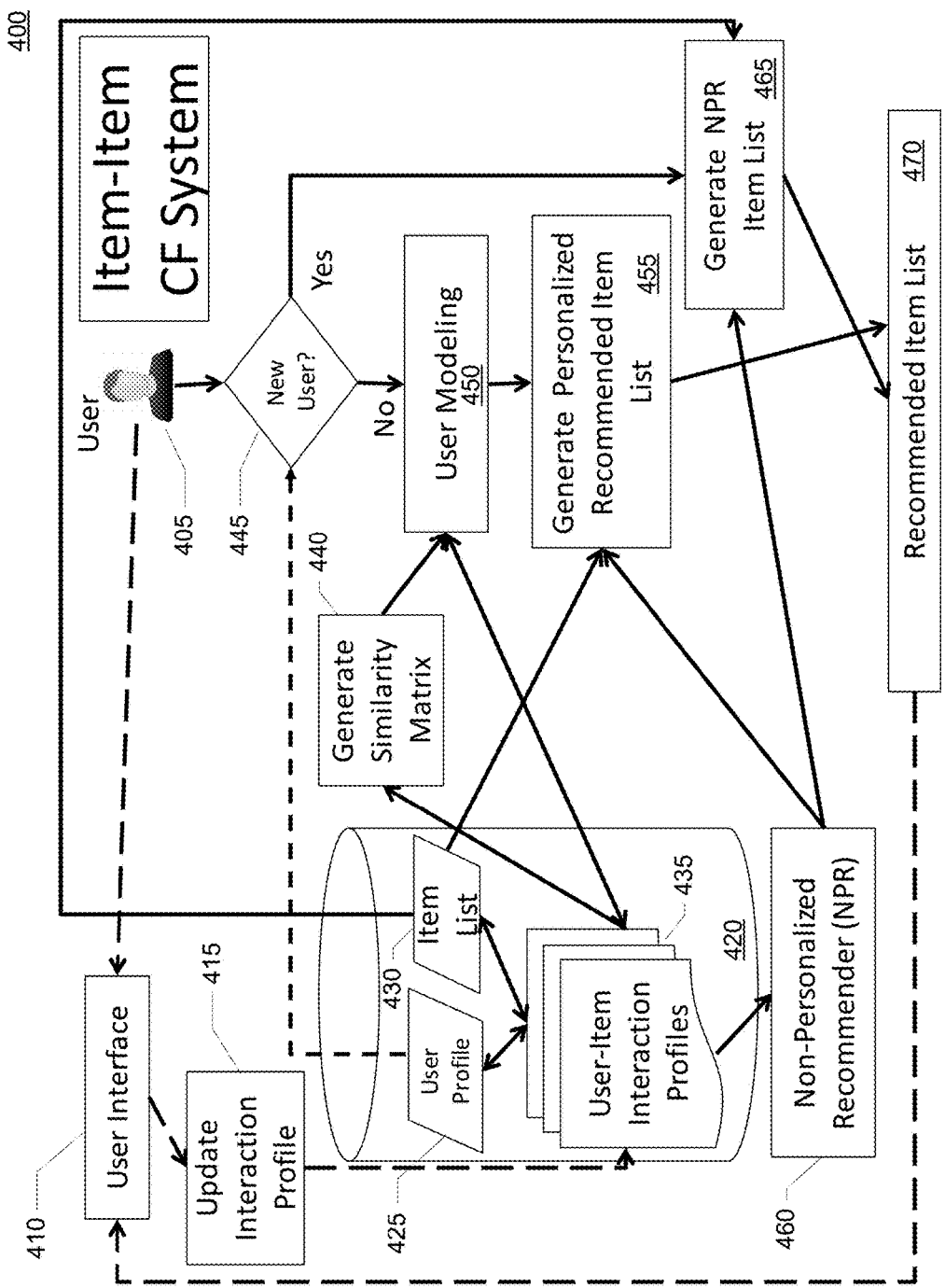
FIG. 4 illustrates an example item-item collaborative filtering system for generating item recommendations for users according to one or more illustrative aspects of the disclosure.

FIG. 4 illustrates an example item-item collaborative filtering system 400 for generating item recommendations 470 for users according to one or more illustrative aspects of the disclosure. The system 400 may include the elements illustrated in FIG. 3, as well as additional elements that will now be explained. A user 405 may interact with the recommendation system 400 via, for example, user interface 410. The user 405 may identify, to the recommendation system 400, content items that the user 405 likes, previously consumed, would like to consume in the future (e.g., bookmarked items), etc. Additionally or alternatively, the recommendation system 400 may automatically track content items that the user likes, such as movies or television shows the user 405 has watched or has scheduled for recording or future playback.

Updated user information 415 may be sent to a database 420, and the information may be added to a user profile 425, an item list 430, and/or a user-item interaction profile 435. The user profile 425 may include information identifying the user, such as the user's address, email, account type (which may determine the type of content available to the user), devices (identified by, e.g., MAC address, IP address, or other device address), and other information identifying the user. The item list 430 may include information identifying content items available for consumption by one or more users. Exemplary types of content items include movies, television shows, songs, speeches, commercials, photographs, documents, presentations, interactive content, and other text, audio, visual, or audiovisual content. The items in the item list 430 may be identified by content item identifiers, such as name, title, trailer identifier, album, or other unique alphanumeric identifiers.

The user-item interaction profiles 435 may correlate users with content items. For example, a profile for User U1 may indicate that User U1 liked or previously consumed (e.g., at least in part watched, listened to, opened, etc.) content items i1, i2, i3, i9, i10, and i11. The profiles 435 may also identify content items that the user has not previously consumed but has indicated an interest in consuming. For example, if User U1 bookmarked a webpage for later viewing or scheduled a movie or TV show for later viewing or recording, the webpage, movie, or TV show may be added to User U1's interaction profile 435.

The system 400 may generate a similarity matrix 440 based on, e.g., user information and content item information from database 420. As previously explained, the similarity matrix 440 may indicate the level of similarity between content items. The similarity matrix 440 may be used by user modeling block 450 to generate a recommended content item list 455. The similarity matrix 440 and recommended content item list 455 will be described in further detail in the examples that follow.

The system 400 may also determine, in block 445, whether the user 405 is a new user or not. This determination may be based on whether a profile 425 for the user exists in the database 420. If the user 405 is not new, the system 400 may proceed to the user modeling block 450 to generate a personalized recommendation list. The personalized recommendation list may take into account the user's previous content consumption history, likes, etc. On the other hand, if the user 405 is new, the system 400 may generate a non-personalized recommendation list 465 using non-personalized recommender 460. The non-personalized recommendation might not take into account the user's previous consumption history and likes because the information might not be available in database 420 for new users. The system 400 may optionally create a profile 425 for the new user and update the database 420 as the user begins watching, recording, bookmarking, etc. content items. Content item recommendations may also comprise a combination of both personalized and non-personalized recommendations, both of which were previously described. Once a recommendation item list 470 is finalized, the system 400 may send and/or display the recommendation list to the user 405 via, for example, user interface 410, which may be (or connected to) one of the user's devices.

FIG. 4 illustrates dotted and solid lines. A dotted line may indicate that that particular process is performed online, whereas a solid line may indicate that that particular process is performed offline. For example, providing the final recommended item list 470 to the user 405 via user interface 410 may be performed online. Generation of the similarity matrix 440 and the personalized recommended item list 455 (or non-personalized recommended item list 465) may be performed offline. However, processes in system 400 are not limited to being performed offline or online as illustrated in FIG. 4, and each process may be performed online or offline in any combination. For example, the similarity matrix 440 may be generated online, user modeling 450 may be performed online, and/or the recommended item list 455 or 465 may be generated online. Online processing may be performed more quickly and with fewer resources if the similarity matrix 440 is reduced in size, as will be explained in further detail in the examples that follow.

Figure 5:
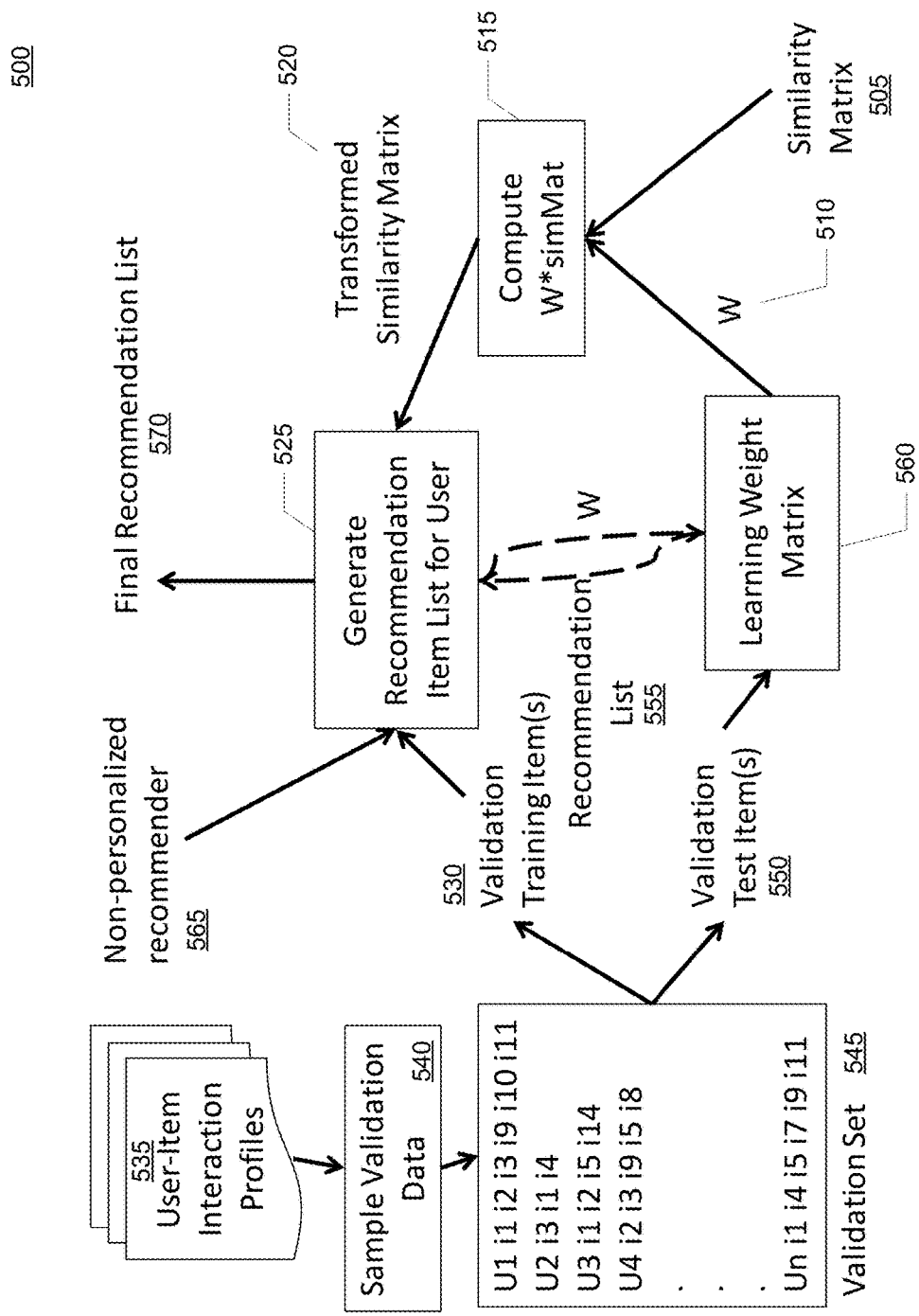
FIG. 5 illustrates an example system for generating item recommendations based on a transformed similarity matrix according to one or more illustrative aspects of the disclosure.
Figure 6:
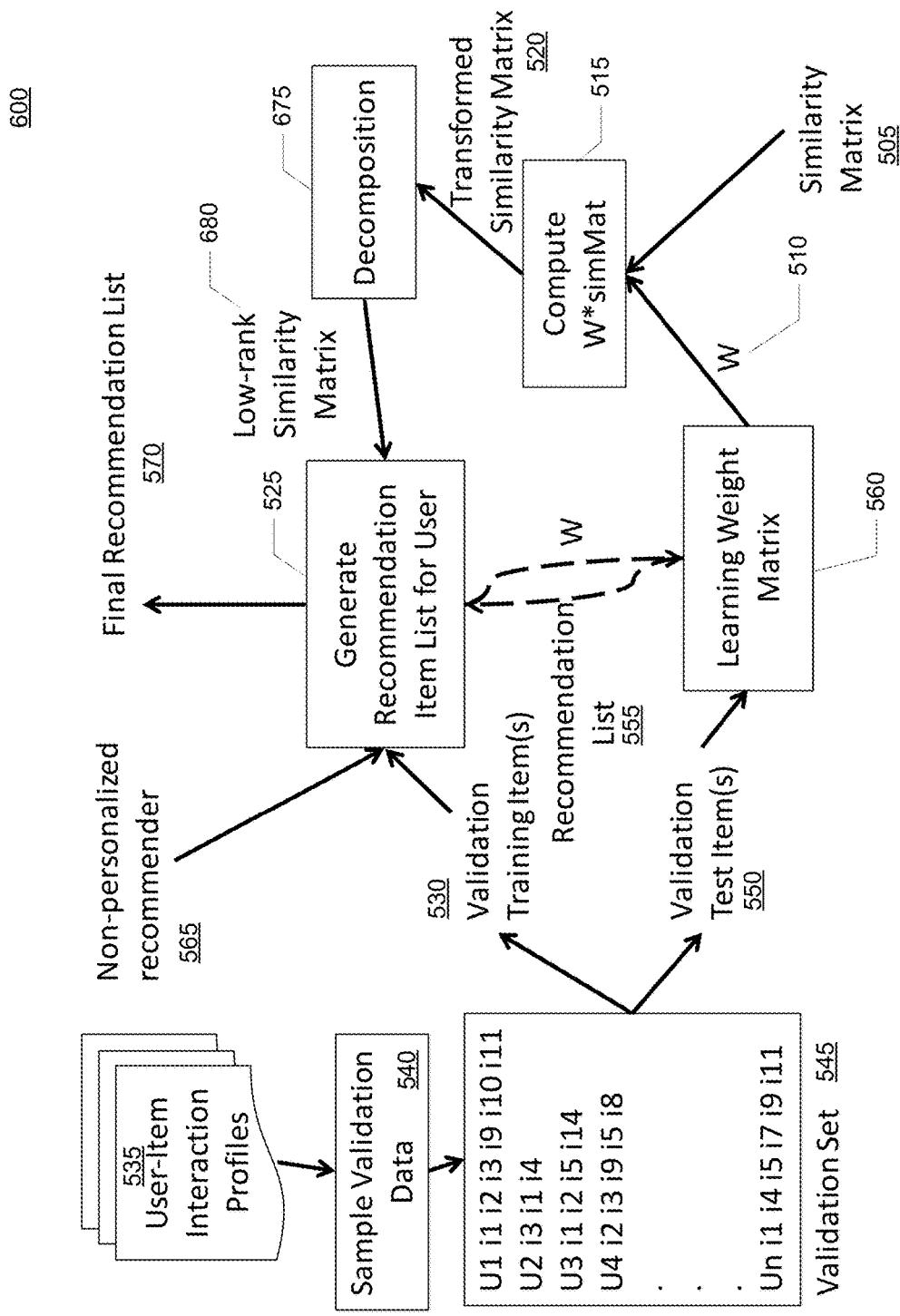
FIG. 6 illustrates an example system for generating item recommendations based on a decomposed similarity matrix according to one or more illustrative aspects of the disclosure.
Figure 7:
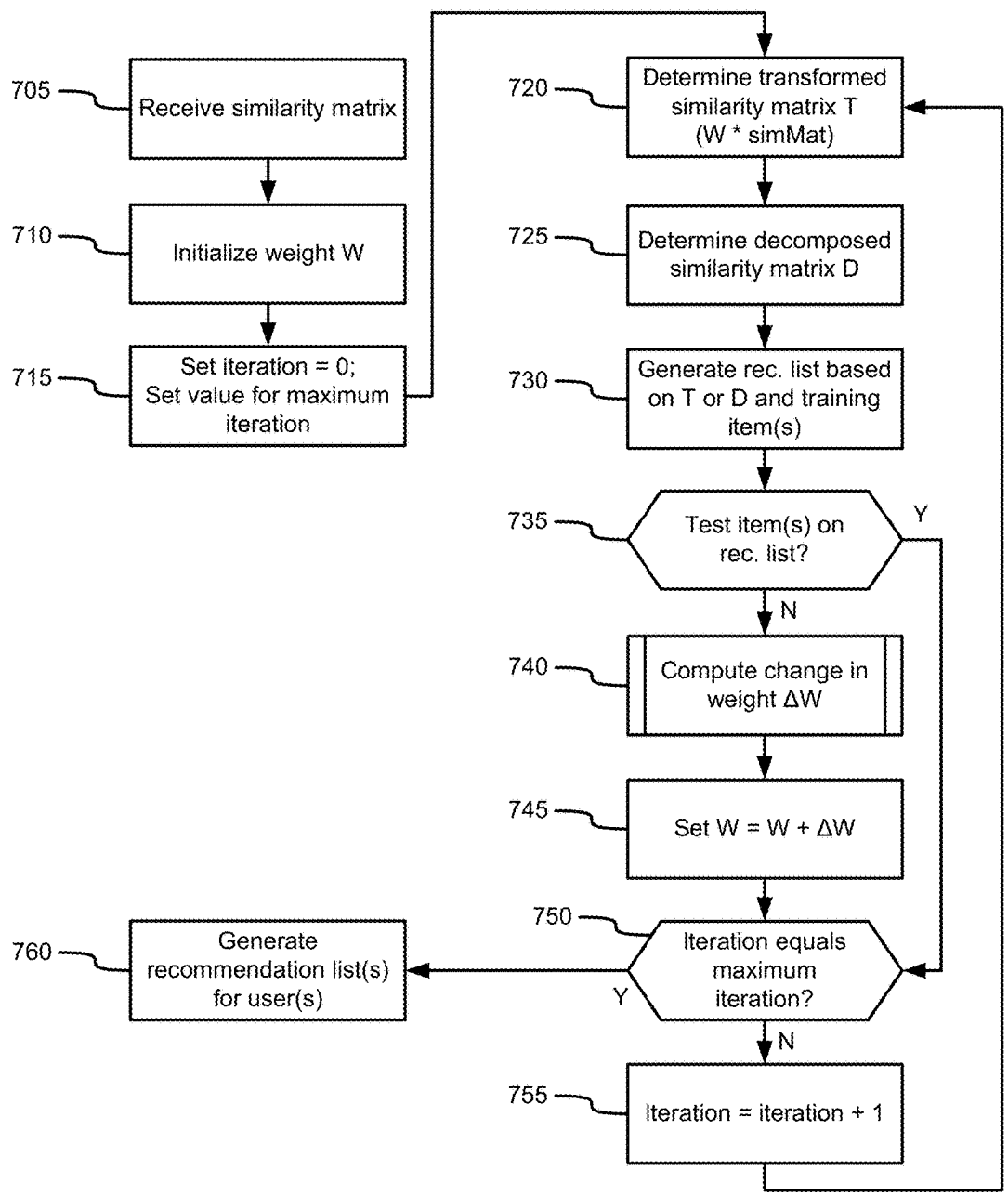
FIG. 7 illustrates an example method for generating item recommendations based on a transformed similarity matrix according to one or more illustrative aspects of the disclosure.

FIG. 5 illustrates an example system 500 for generating item recommendations based on a transformed similarity matrix 520 according to one or more illustrative aspects of the disclosure. FIG. 6 illustrates an example system 600 for generating item recommendations based on a decomposed (e.g., low-rank) similarity matrix 680 according to one or more illustrative aspects of the disclosure. In particular, the transformed similarity matrix 520 may be decomposed (or otherwise reduced in size) to generate a decomposed similarity matrix 680, and the decomposed similarity matrix may be used to generate content recommendations. Each element in systems 500 and 600 may represent one or more computing device configured to receive, process, and/or send information. Additionally or alternatively, the systems 500 and 600 may comprise a single computing device (or multiple computing devices) configured to perform the steps illustrated in FIG. 7. FIG. 7 illustrates an example method for generating item recommendations based on a transformed similarity matrix according to one or more illustrative aspects of the disclosure. FIGS. 5, 6, and 7 will be explained together.

With reference to FIG. 5, the system 500 may apply a weight W 510 to a similarity matrix 505, and the resulting transformed (e.g., weighted) similarity matrix 520 may be used to generate content item recommendations for one or more users. Moreover, the transformed similarity matrix may be reduced to a decomposed similarity matrix 680, as illustrated in FIG. 6, prior to generating recommendations. With reference to FIG. 7, the system 500 or 600 may be initialized (at least in part) in steps 705, 710, and 715. These steps may be performed in any order. In step 705, the system 500 or 600 may receive (and/or retrieve from memory) a similarity matrix 505. As previously explained, the similarity matrix may be very large. For example, if there are 100,000 content items, the similarity matrix may have dimensions of 100,000 columns by 100,000 rows. The similarity matrix 505 may optionally be scaled in step 705, by modifying each value in the similarity matrix 505 by the same transformation. For example, the system may add to, subtract from, multiply or divide each value in the similarity matrix 505 by the same amount.

In step 710, the computing device 515 may initialize the weight W to an initial value. Initial weight $W_0$ may comprise a matrix having the same dimensions as the similarity matrix. For example, the initial weight $W_0$ matrix may correspond to the similarity matrix, where non-zero elements in the similarity matrix are assigned a value of 1 in the weight matrix, and zero elements in the similarity matrix are assigned a value of 0 in the weight matrix, as illustrated in the following example:

$$\begin{bmatrix} 3 & 0 \\ 0 & 4 \end{bmatrix} \times \begin{bmatrix} 1 & 0 \\ 0 & 1 \end{bmatrix} = \begin{bmatrix} 3 & 0 \\ 0 & 4 \end{bmatrix}$$

$$simMat_{old} \times W_0 = simMat_{new}$$

Alternatively, if initial weight $W_0$ is a single value, weight $W_0$ may be set to an initial value of 1.

$$\begin{bmatrix} 3 & 0 \\ 0 & 4 \end{bmatrix} \times 1 = \begin{bmatrix} 3 & 0 \\ 0 & 4 \end{bmatrix}$$

-continued $$simMat_{old} \times W_0 = simMat_{new}$$

Initial weight $W_0$ is not limited to the above-described examples and may be assigned any value(s). In some aspects, $W_0$ may comprise a similarity matrix, such as simMat$_{old}$, a similarity matrix generated using conventional similarity measures (e.g., cosine similarity), or any other similarity matrix.

In step 715, a computing device in system 500 or 600 may set an iteration count to an initial value (e.g., 0) and set the value for the maximum number of iterations. The iteration count may be used to determine (or keep track of) the number of times to adjust the weight W before the transformed similarity matrix is finalized. The maximum iteration count may be set to a predetermined number, such as 30 or 1000, and the system may adjust the weight W 30 or 1000 times before applying the final weight to the similarity matrix. The maximum iteration count may correspond to the number of users for which to adjust weight W. For example, if the system decides to adjust the weight W for 632 users, the maximum iteration count may be set to 632, and the method illustrated in FIG. 700 may be performed for all 632 users. The maximum iteration count may be set to a value large enough for the difference in recall performance before and after application of the weight W to be less than a certain threshold, as will be described in further detail in the examples below. By using an iteration count, the system may reduce the amount of time used to process and determine the weight to use for content recommendations.

In step 720, the computing device 515 may determine a transformed similarity matrix T based on the weight W and the similarity matrix. For example, the computing device 515 may multiply the weight W by the similarity matrix. As illustrated in the above example, if the dimensions of the similarity matrix is 2×2, the multiplication may be as follows:

$$\begin{bmatrix} 3 & 0 \\ 0 & 4 \end{bmatrix} \times \begin{bmatrix} 1 & 0 \\ 0 & 1 \end{bmatrix} = \begin{bmatrix} 3 & 0 \\ 0 & 4 \end{bmatrix}$$

$$simMat_{old} \times W_0 = simMat_{new}$$

simMat$_{old}$ represents the original similarity matrix, $W_0$ represents the initial weight matrix W, and simMat$_{new}$ represents the transformed similarity matrix T. The transformed similarity matrix T may have the same dimensions as the original similarity matrix.

In step 725, the computing device 675 (illustrated in FIG. 6) may optionally determine a decomposed similarity matrix D 680 based on the transformed similarity matrix T and a matrix reduction algorithm. As previously explained, time and space savings may be significant if the size of the similarity matrix is reduced, especially if content recommendations are generated online. Examples of reducing the size of the similarity matrix will now be provided.

Figure 9:
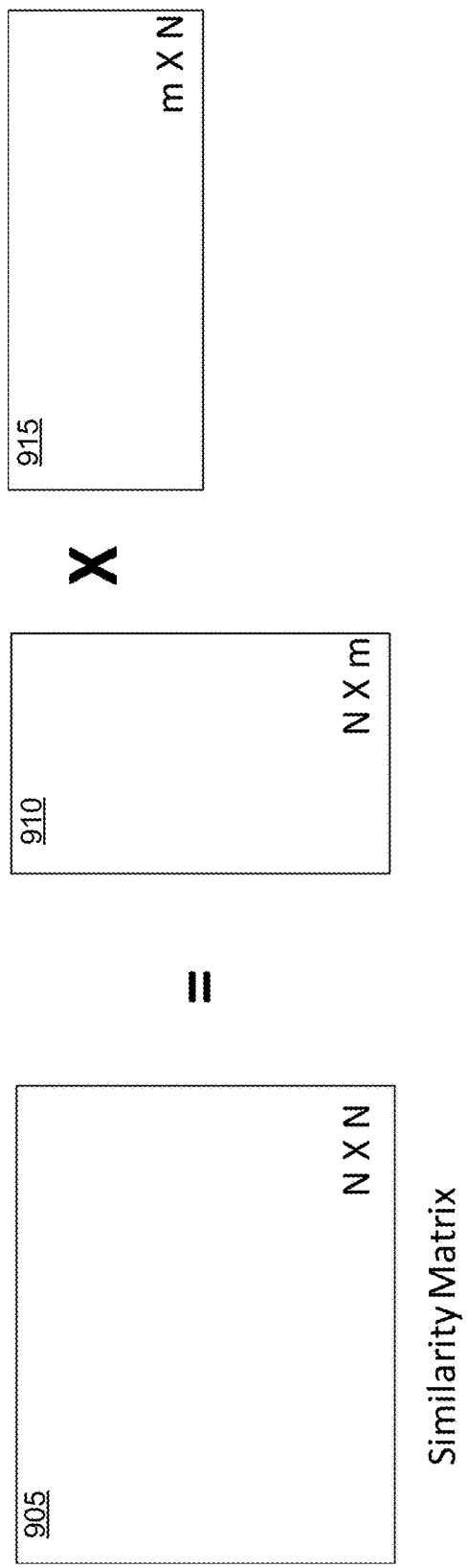
FIG. 9 illustrates an example method for reducing a similarity matrix according to one or more illustrative aspects of the disclosure.

FIG. 9 illustrates an example method for reducing a similarity matrix 905 according to one or more illustrative aspects of the disclosure. The dimensions of the similarity matrix 905 may be N×N, but it can be decomposed (or reduced in dimension) into multiple smaller matrices, such as matrix 910 (having dimensions of N×m) and matrix 915 (having dimensions of m×N). N may be the number of content items in the similarity matrix, and m may be the number of latent factors (the decomposed dimension). In some aspects, N may be much larger than m. In some embodiments, no information is lost in the reduction process, and multiplying matrix 910 and matrix 915 results in the original similarity matrix 905. In other embodiments, information might be lost in the reduction process, and multiplying matrix 910 and matrix 915 may result in an approximation of the original similarity matrix 905.

The size of the transformed similarity matrix may be reduced using singular value decomposition (SVD). As explained below, the loss in content recommendation performance may be minimal with a SVD of the transformed similarity matrix. Alternatively, the size of the transformed similarity matrix may be reduced using non-linear dimensionality reduction (NLDR).

With reference to FIG. 5, the system may include a database that stores user-item interaction profiles 535 that correlate users with one or more content items, such as content items that a particular user liked, previously consumed, and/or is expected to consume in the future. The system may generate sample validation data 540 and/or validation set 545 from the user-item interaction profiles 535. The validation set 545 may comprise all users, some users, all content items, or some content items (and a combination thereof) identified in the interaction profiles 535. The validation set 545 may comprise a number of users that matches the maximum iteration number so that the weight W may be adjusted for each user included in the validation set 545. The validation data 540 and/or validation set 545 may be used to determine a weight to apply to a similarity matrix and to validate that the weight similarity matrix results in accurate content recommendations (e.g., relative to an unweighted similarity matrix), as will be explained in further detail below. The user-item interaction profile 535 (and validation set 545) may be updated with content items that a particular user has recently consumed (e.g., new items).

In step 730, the computing device 525 may generate a content item recommendation list 555 for a user based on the transformed similarity matrix T (in system 500) or the decomposed similarity matrix D (in system 600) and one or more training item(s) 530. The training item(s) 530 may comprise items taken from the validation set 545 for a particular user. The test item(s) 550 may also comprise items taken from the validation set 545 for the particular user. In some aspects, the training items 530 may comprise a subset of the set of items liked or consumed by the user (e.g., approximately 80% of the items), and the test items 550 may comprise the remainder of the items (e.g., approximately 20% of the items). For example, for user U3, the training items 530 may comprise items i1, i2, and i5, and the test item 550 may comprise item i14, each of which user U3 may have previously consumed or liked. In some aspects, the training items 530 and the test items 550 may be randomly chosen. The training items 530 may be used to generate the content item recommendation list 555.

The content item recommendation list 555 may include content items having a recommendation score greater than a threshold, which may result in the top-K items being recommended to a user. The content recommendation list 555 may be ordered based on the recommendation score of each item, the item with the highest recommendation score being first and the item with the lowest recommendation score being last on the list. In some aspects, the content recommendation list may be generated using, for example, the method illustrated in FIG. 7 and described in the detailed description of U.S. Pat. No. 8,843,430 to Jojic et al., which is hereby incorporated by reference in its entirety. The content recommendation item list 555 may also be generated based on a non-personalized recommender 565, as previously explained with reference to FIG. 4.

In step 735, the computing device 560 may determine whether one or more test item(s) 550 made it onto the generated content recommendation list. The test item(s) 550 may comprise content item(s) that should have been recommended to a particular user, and may be identified in the validation set 545 for the user. As explained above, the test item(s) 550 may comprise a different set of items than the training item(s) 530. For example, the test item(s) 550 may comprise the remainder of the items in the validation set 545 not used as training items 530 (e.g., item i14 for user U3). As another example, the test item(s) 550 may comprise one or more content items that a user recently consumed (e.g., new items or items consumed within the last X minutes), whereas the training item(s) 530 may comprise one or more content items the user liked or previously consumed (e.g., old items or items consumed more than Y minutes ago). For user U3, the test items 550 may comprise one or more of items i5, i7, and i9, which, as illustrated in FIG. 3, may be items that user U3 recently consumed, bookmarked, or otherwise liked. As another example, the test items 550 may comprise a subset of content items that the user previously consumed or liked and the training items 530 may comprise a different subset of content items that the user previously consumed or liked.

Instead of or in addition to determining whether test item(s) 550 made it onto the recommendation list, the computing device 560 may determine in step 735 whether one or more of the test item(s) 550 is within the top-K items on the recommendation list. The top-K items may include all items having a recommendation score greater than a particular threshold. After being generated, the recommendation list 555 may be ordered by recommendation score, with the item having the highest recommendation score being first on the list and the item having the lowest recommendation score being last on the list. The computing device 560 may determine in step 735 whether the test item(s) 550 are within the top-K items on the recommendation list. If the test item(s) 550 are on the recommendation list or are within the top-K items on the list (step 735: Y), the method may proceed to step 750, which will be described in further detail below.

If the test item(s) 550 are not on the recommendation list 555 or are not within the top-K items on the list (step 735: N), in step 740, the computing device 560 may compute a change in the weight W (i.e., ΔW) so that the test item(s) 550 would be included on the recommendation list 555 or within the top-K items on the list. For example, for user U3, the computing device 560 may determine the ΔW needed so that one or more of the content items i5, i7, and i9 is included in the recommendation list (or included within the top-K spots in the recommendation list). In other words, the computing device 560 may determine the desired recommendation score for items i5, i7, and/or i9, which may be greater than a threshold score needed to push the items onto the recommendation list or into the top-K spots for user U3.

The discussion below will be used to explain how to calculate the ΔW, but first with a discussion of how to determine the recommendation score. The recommendation score $l(x_j)$ for an item $x_j$ (a test item) may be determined using the following equation:

$$l(x_j) = p(x_j) * \left(1 + \sum_{x_k | sim(x_j, x_k) > 1} (w_{jk} * sim(x_j, x_k) - 1)\right)$$

The weight $w_{jk} \in W$ may comprise a linear transformation applied to each element in the similarity matrix sim(•,•) on an element-by-element basis. W may have the same sparsity as the similarity matrix sim(•,•) if W is an element-by-element linear transformation of the similarity matrix. $x_k$ may comprise an item for which $sim(x_j, x_k) > 1$. In other words, k may comprise an index to an item for which the above condition is satisfied. $p(x_j)$ may comprise the probability that a particular user will like item $x_j$. Determining $p(x_j)$ is described in U.S. Pat. No. 8,843,430 to Jojic et al., which is hereby incorporated by reference in its entirety.

The recall of a particular test item may represent whether the test item was recommended or within the top-K items on the recommendation list. The computing device 560 may maximize the recall (recall@K) by determining the value of K where recall@K is given by the ratio of relevant test items placed within the first K items of the sorted recommendation list to the total number of relevant test items for the user. Improving recall@K performance through a learning process may include pushing as many relevant test items as possible within the top-K list in the sorted array of recommended items. Such an algorithm would involve learning the weight $w_{jk}$ that maximally allows test items to be pushed within the top-K items.

The change in recommendation score to push test item $x_j$ into the top-$K^{th}$ position of the recommendation list is represented by $l(x_K) - l(x_j)$, where $x_K$ is the item at the K-th position in the sorted recommendation list. In some aspects, the change in recommendation score to push item $x_j$ into the top-K position may be determined in the L1 norm (e.g., the absolute value of $l(x_K) - l(x_j)$). In other aspects, the L1 norm might not be easily differentiable, and the L2 norm may be used to determine the change in recommendation score to push item $x_j$ into the top-K position. For example, the change may be determined based on the following optimization:

$$J(w) = \frac{1}{2}\|l(x_K) - l(x_j)\|^2 + \frac{\lambda}{2}\|W\|_2^2$$

$x_K$ represents the item that is currently at the K-th position in the ordered recommendation list. $l(x_K)$ represents the desired recommendation score for test item $x_j$ (i.e., the score needed to push item $x_j$ into the $K^{th}$ position). $l(x_j)$ represents the actual recommendation score for test item $x_j$ (i.e., the recommendation score generated based on the similarity matrix). λ represents a regularization parameter, which may be used to smooth the weight values W and compensate for over-fitting of the learned weights (e.g., when the weight is adjusted for multiple users). Regression learning, such as ridge regression learning or any other conventional method of regression learning, may be used to determine λ. λ may be learned during cross validation.

While the above algorithm is used to push test item $x_j$ into the $K^{th}$ position on the recommendation list, the algorithm may also be used to push the test item $x_j$ into any position on the recommendation list, such as the K-$1^{th}$ position, the K-$8^{th}$ position, the first position, etc. While the remainder of the disclosure illustrates how test items are pushed to the $K^{th}$ position, one of ordinary skill in the art would recognize that the systems, methods, and algorithms described herein may be used to place test items at any position on the recommendation list. The corresponding weight update ΔW $$\frac{\delta J(w)}{(\delta w_{jk})}$$

to the weight matrix W may be determined as follows:

$$\frac{\delta J(w)}{\delta w_{jk}} = (l(x_K) - l(x_j)) \frac{\delta(l(x_d) - l(x_j))}{\delta w_{jk}} + \lambda w_{jk},$$
$$= (l(x_K) - l(x_j)) \cdot \sum_{x_k | sim(x_j, x_k) > 1} (-1) \cdot sim(x_j, x_k) \cdot p(x_j) + \lambda w_{jk}$$

The new weight W may be determined as follows:

$$w_{jk} = w_{jk} + \gamma \cdot \frac{\delta J(w)}{\delta w_{jk}}$$

γ comprises the learning rate and may be learned through cross validation.

In step 745, the computing device 560 may adjust the weight W, such as setting the new weight W to the old weight W plus the change in weight ΔW (i.e., W=W+ΔW). As previously discussed, the change in weight ΔW may comprise the change needed to bring one or more test item(s) 550 into the top-K items on the recommendation list.

In step 750, a computing device in the system 500 or 600 may determine whether the iteration count equals a maximum iteration count. For example, the computing device may determine whether the new weight has considered each user in the validation set 545, training items 530, or test items 550. If the iteration count does not equal the maximum iteration count (step 750: N), in step 755, the iteration count may be incremented, and the method may return to step 720 to determine a transformed similarity matrix T using the new weight W.

Optimizing and learning W may take a greedy approach. For example, weight updates that each user makes to the weight matrix can be made in a stochastic gradient descent manner, with the weight regularization factor λ used so that the learning process does not over-fit. In other words, because the system may make changes to W for each user in a greedy fashion, the regularization factor λ may be used to ensure both that each user does not necessarily reach a 100% recall performance (e.g., not all desired test item(s) are included in the recommendation list for that user) and that each user benefits from the resultant transformation updates.

The final weight matrix W may be determined using a stochastic gradient descent approach and based on a regularization parameter λ and a learning rate γ. For each user considered by the system 500 (or 600), a weight update $$\frac{\delta J(w)}{\delta w_{jk}}$$

and new weight $w_{jk}$ may be determined, and the weight matrix W may be modified accordingly. After all users have been considered (e.g., the current iteration equals the maximum iteration in step 750), the test item(s) 550 may be used to determine the recall of the test item(s) 550 before (brecall@K) and after (arecall@K) applying the weight matrix W. If the difference between the before and after recalls is less than a threshold (e.g., a threshold of 0.01), the system 500 (or 600) may determine that the final matrix is the learned weight matrix W. Otherwise, one or more of steps 720-755 may be repeated until the current iteration equals a maximum iteration value (step 750: Y) and/or the difference between the before and after recalls is less than the threshold.

FIG. 9 illustrates another example algorithm 800 for determining a weight W used to transform a similarity matrix according to one or more illustrative aspects of the disclosure. In particular, the weight matrix W may be updated until the difference between the before and after recalls is less than a threshold T. In step 805, the weight matrix W may be initialized, as previously explained for step 710. In step 810, the similarity matrix may be received and optionally scaled, as previously explained for step 705. In step 815, a transformed similarity matrix T may be determined based on the similarity matrix and weight matrix W, as previously explained for step 720.

In step 820, the recommendation system may generate a content item recommendation list, which may be sorted in descending order from highest recommendation score to lowest recommendation score, as previously explained for step 730. A recommendation list may be generated for each user in the set of users U.

In step 825, the recommendation system may compute the recall of test item(s) 550 in the top-K of the recommendation list (brecall@K). In step 830, the recommendation system may generate a list of test item(s) 550 not in the top-K of the recommendation list, as previously explained for step 735. In step 835, the recommendation system may compute the weight update needed to bring one or more of the test item(s) 550 into the top-K of the recommendation list for a particular user, as previously explained for step 740. In step 840, the recommendation system may update the weight matrix with the new weight value, as previously explained for step 745. Steps 830, 835, and 840 may be repeated for each user in the set of users U.

In step 845, the recommendation system may determine the transformed similarity matrix T based on the updated weight matrix W and the original similarity matrix. In step 850, the recommendation system may generate a content item recommendation list, which may be sorted in descending order from highest recommendation score to lowest recommendation score. A recommendation list may be generated for each user in the set of users U.

In step 855, the recommendation system may compute the recall of test item(s) 550 in the top-K of the recommendation list (arecall@K). In step 860, the recommendation system may determine whether the difference between brecall@K and arecall@K is less than a threshold. If the difference is less than the threshold (step 860: Y), the recommendation system may return the final weight matrix W in step 865, which may be used to generate content item recommendations for one or more users. On the other hand, if the difference is not less than the threshold (step 860: N), the recommendation system may continue to adjust the weight matrix W as explained above until the difference in before and after recall is less than the threshold (or a maximum iteration count is met).

Returning to FIG. 7, if the iteration count equals the maximum iteration count (step 750: Y) or the threshold described above is met, in step 760, the computing device 525 may generate one or more final recommendation lists 570 based on the final transformed and/or decomposed similarity matrix. For example, a recommendation list 570 may be generated for one or more of the users identified in the validation set 545. The final transformed and/or decomposed similarity matrix may also be used to generate content item recommendations for one or more users not identified in the validation set 545. In other words, the weight W may be determined using a representative set of users in the system, but not all of the users. However, the weight W may be used to generate recommendations for all users.

The various features described above are merely non-limiting examples, and can be rearranged, combined, subdivided, omitted, and/or altered in any desired manner. For example, features of the computing device described herein (which may be one of servers 105, 106, and/or 107) can be subdivided among multiple processors and computing devices. The true scope of this patent should only be defined by the claims that follow.

We claim:

1. A method comprising:
   generating, by a computing device, a first list of content items to recommend to a user based on a content item by content item similarity matrix;
   based on a determination that a first content item was not in the first list of content items to recommend to the user, applying, by the computing device, a weight to the content item by content item similarity matrix to generate a weighted content item by content item similarity matrix, wherein each value of a plurality of values in the weighted content item by content item similarity matrix indicates a level of similarity between a content item in a row, of the weighted content item by content item similarity matrix, corresponding to the value and a content item in a column, of the weighted content item by content item similarity matrix, corresponding to the value;
   generating, by the computing device, a reduced item by item similarity matrix by applying a matrix reduction algorithm to the weighted content item by content item similarity matrix, wherein the reduced item by item similarity matrix is smaller than the weighted content item by content item similarity matrix;
   generating a second list of content items to recommend to the user based on the reduced item by item similarity matrix; and
   determining whether the first content item was in the second list of content items to recommend to the user.

2. The method of claim 1, wherein the user comprises a first user, the method further comprising:
   based on determining that the first content item was in the second list of content items to recommend to the first user, generating a third list of content items to recommend to a second user based on the reduced item by item similarity matrix;
   based on a determination that a second content item was not in the third list of content items to recommend to the second user, updating the weight and applying the updated weight to the content item by content item similarity matrix to generate a second weighted content item by content item similarity matrix;
   generating a second reduced item by item similarity matrix by applying a matrix reduction algorithm to the second weighted content item by content item similarity matrix, wherein the second reduced item by item similarity matrix is smaller than the second weighted content item by content item similarity matrix; and
   generating a fourth list of content items to recommend to the first user based on the second reduced item by item similarity matrix.

3. The method of claim 1, further comprising:
   generating a third list of content items to recommend to a second user based on the reduced item by item similarity matrix.

4. The method of claim 1, wherein:
   the determination that the first content item was not in the first list of content items to recommend to the user comprises a determination that the first content item and a second content item were not in the first list of content items to recommend to the user, and
   determining whether the first content item was in the second list of content items to recommend to the user comprises determining whether the first content item and the second content item were in the second list of content items to recommend to the user.

5. The method of claim 4, further comprising:
   determining that the user previously consumed the first content item,
   wherein the determination that the first content item was not in the first list of content items to recommend to the user is performed based on determining that the user previously consumed the first content item.

6. The method of claim 4, further comprising:
   determining that the user liked the first content item,
   wherein the determination that the first content item was not in the first list of content items to recommend to the user is performed based on determining that the user liked the first content item.

7. The method of claim 1, wherein the weight comprises a weight matrix.

8. The method of claim 1, wherein the applying the weight to the content item by content item similarity matrix comprises linearly transforming the content item by content item similarity matrix using the weight.

9. The method of claim 1, wherein the applying the weight to the content item by content item similarity matrix comprises nonlinearly transforming the content item by content item similarity matrix using the weight.

10. The method of claim 1, wherein the matrix reduction algorithm comprises a singular value decomposition (SVD) algorithm, and wherein the reduced item by item similarity matrix comprises a decomposed item by item similarity matrix.

11. The method of claim 10, wherein:
    the generating the second list of content items to recommend to the user based on the reduced item by item similarity matrix comprises generating the second list of content items to recommend to the user based on the decomposed item by item similarity matrix.

12. A method comprising:
    based on a determination that a first content item was not in a first list of content items to recommend to a user, determining, by a computing device, a weight to apply to a content item by content item similarity matrix to place the first content item at a first position in the first list of content items to recommend to the user;
    generating, by the computing device, a weighted content item by content item similarity matrix by applying the weight to the content item by content item similarity matrix, wherein each value of a plurality of values in the weighted content item by content item similarity matrix indicates a level of similarity between a content item in a row, of the weighted content item by content item similarity matrix, corresponding to the value and a content item in a column, of the weighted content item by content item similarity matrix, corresponding to the value;

generating, by the computing device, a reduced item by item similarity matrix by applying a matrix reduction algorithm to the weighted content item by content item similarity matrix, wherein the reduced item by item similarity matrix is smaller than the weighted content item by content item similarity matrix; and generating a second list of content items to recommend to the user based on the reduced item by item similarity matrix.

13. The method of claim 12, wherein determining the weight to apply to the content item by content item similarity matrix to place the first content item at the first position in the first list of content items to recommend to the user comprises:

determining a recommendation score for a second content item at the first position in the first list of content items to recommend to the user; and determining the weight to apply to the content item by content item similarity matrix so that a recommendation score for the first content item is greater than or equal to the recommendation score for the second content item.

14. The method of claim 12, wherein applying the weight to the content item by content item similarity matrix comprises multiplying the weight and the content item by content item similarity matrix.

15. The method of claim 12, further comprising:

based on a determination that the first content item was in the second list of content items to recommend to the user, generating a third list of content items to recommend to a second user based on the reduced item by item similarity matrix.

16. The method of claim 12, wherein:

the determination that the first content item was not in the first list of content items to recommend to the user comprises a determination that the first content item and a second content item were not in the first list of content items to recommend to the user, and determining the weight to apply to the content item by content item similarity matrix to place the first content item at the first position in the first list of content items to recommend to the user comprises determining the weight to apply to the content item by content item similarity matrix to place the first content item at the first position and to place the second content item at a second position in the first list of content items to recommend to the user.

17. The method of claim 12, further comprising:

transmitting, to a display device associated with the user, the second list of content items to recommend to the user.

18. A method comprising:

determining, by a computing device, a first weight to apply to a content item by content item similarity matrix in order to include a first content item on a first list of content items to recommend to a first user;

determining, by the computing device, a second weight to apply to the content item by content item similarity matrix in order to include a second content item on a second list of content items to recommend to a second user;

determining a combined weight based on the first weight and the second weight;

applying, by the computing device, the combined weight to the content item by content item similarity matrix to generate a weighted content item by content item similarity matrix, wherein each value of a plurality of values in the weighted content item by content item similarity matrix indicates a level of similarity between a content item in a row, of the weighted content item by content item similarity matrix, corresponding to the value and a content item in a column, of the weighted content item by content item similarity matrix, corresponding to the value;

generating, by the computing device, a reduced item by item similarity matrix by applying a matrix reduction algorithm to the weighted content item by content item similarity matrix, wherein the reduced item by item similarity matrix is smaller than the weighted content item by content item similarity matrix; and generating a third list of content items to recommend to the first user based on the reduced item by item similarity matrix.

19. The method of claim 18, further comprising:

generating a fourth list of content items to recommend to the second user based on the reduced item by item similarity matrix.

20. The method of claim 19, further comprising:

generating a fifth list of content items to recommend to a third user based on the reduced item by item similarity matrix.

* * * * *

UNITED STATES PATENT AND TRADEMARK OFFICE
CERTIFICATE OF CORRECTION

PATENT NO. : 10,191,949 B2
APPLICATION NO. : 14/743374
DATED : January 29, 2019
INVENTOR(S) : Ng et al.

It is certified that error appears in the above-identified patent and that said Letters Patent is hereby corrected as shown below:

On the Title Page

(72) Inventor, Line 4 fourth inventor:
Please delete "Hassan Sayyadi-Harikandehei" and insert --Hans Sayyadi--

Signed and Sealed this
Twenty-seventh Day of August, 2019

Andrei Iancu
*Director of the United States Patent and Trademark Office*